US012564893B2

(12) United States Patent
Mazzolini et al.

(10) Patent No.: US 12,564,893 B2
(45) Date of Patent: Mar. 3, 2026

(54) METHOD FOR ELECTRICAL DISCHARGE MACHINING

(71) Applicant: Agie Charmilles SA, Losone (CH)

(72) Inventors: Livio Mazzolini, Ponte Capriasca (CH); Marco Boccadoro, Verscio (CH); Rino D'Amario, Sigirino (CH)

(73) Assignee: Agie Charmilles SA, Losone (CH)

( * ) Notice: Subject to any disclaimer, the term of this patent is extended or adjusted under 35 U.S.C. 154(b) by 666 days.

(21) Appl. No.: 18/077,525

(22) Filed: Dec. 8, 2022

(65) Prior Publication Data

US 2023/0182222 A1     Jun. 15, 2023

(30) Foreign Application Priority Data

Dec. 9, 2021     (EP) ..................................... 21213367

(51) Int. Cl.
*B23H 1/02*          (2006.01)
*B23H 9/06*          (2006.01)

(52) U.S. Cl.
CPC ............... *B23H 1/022* (2013.01); *B23H 9/06* (2013.01)

(58) Field of Classification Search
CPC ........ B23H 1/022; B23H 9/06; B23K 26/703; B23K 26/082; B23K 26/32; B23K 26/24; B23K 26/28; B23K 26/22; B23K 26/0622; B23K 2101/18; B23K 2101/006; B23K 26/323; B23K 26/044; B23K 2203/00; B23K 2203/04; B23K 26/26; B23K 26/244; B23K 26/14; B23K 31/125; B23K 26/20; B23K 26/0066; B23K 26/0626; B23K 26/073; B23K 26/38; B23K 26/0619; B23K 26/0624; B23K 26/53; B23K 26/0006; B23K 26/0676; B23K 26/0861; B23K 2103/56; B23K 2101/40

USPC ......... 219/121.63, 121.64, 121.72, 136, 119, 219/69.17
See application file for complete search history.

(56) References Cited

U.S. PATENT DOCUMENTS 6,252,191 B1 *    6/2001    D'Amario .............. B23H 7/065
                                                                    219/69.18
7,638,726 B2    12/2009    Hashimoto et al.
2008/0110865 A1 *    5/2008    Hashimoto .............. B23H 7/04
                                                                    219/69.12

(Continued)

FOREIGN PATENT DOCUMENTS

CH          653585 A5    1/1986
EP          3446820 A1    2/2019

(Continued)

OTHER PUBLICATIONS

Professor Dr. Ing. Fritz Klocke, et al. "Fertigungsverfahren 3", (150 pages). The relevancy of this book is discussed in the background portion of the specification of this application.

*Primary Examiner* — Phuong T Nguyen
(74) *Attorney, Agent, or Firm* — Harness, Dickey & Pierce, P.L.C.

(57)          ABSTRACT

The invention relates to a method and device for electrical Wire electrical discharge machining method (WEDM) for forming a desired pattern on a workpiece by a WEDM machine tool, in which a preliminary voltage pulse is applied to a gap between a wire electrode and a workpiece, and in which, at the breakdown of said preliminary voltage pulse, a first machining discharge pulse is applied to the wire electrode.

20 Claims, 7 Drawing Sheets

(56)  References Cited

U.S. PATENT DOCUMENTS

2019/0061031 A1    2/2019  D'Amario

FOREIGN PATENT DOCUMENTS

Figure 1:
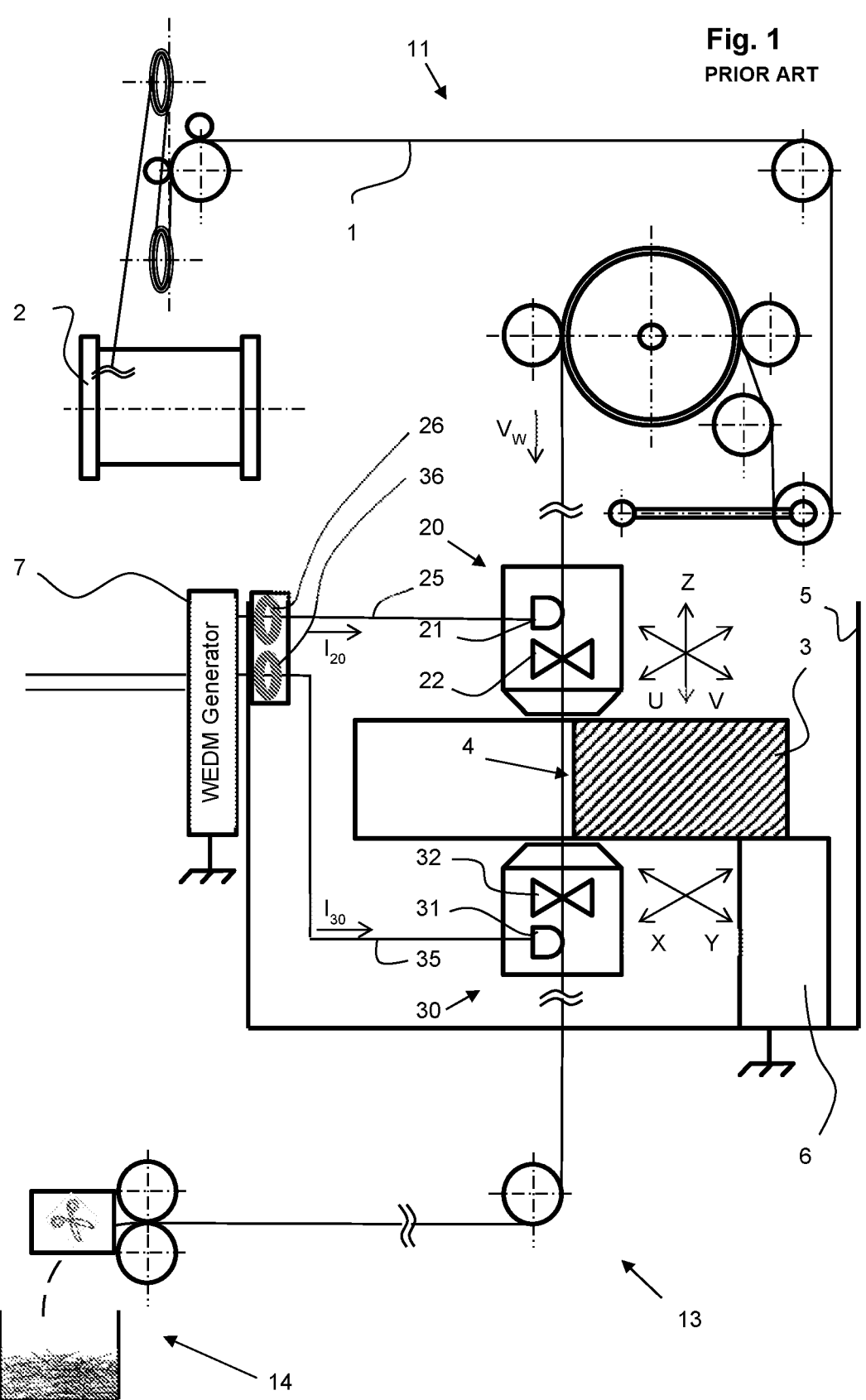

| | | |
|---|---|---|
| JP | S5364899 A | 6/1978 |
| JP | S63288627 A | 11/1988 |
| JP | H0386427 A | 4/1991 |
| JP | H08294821 A | 11/1996 |
| KR | 2017-0130983 | 11/2017 |

* cited by examiner

METHOD FOR ELECTRICAL DISCHARGE MACHINING

CROSS-REFERENCE TO RELATED APPLICATION

This application claims the benefit and priority of European Patent Application No. 21 213 367.2 filed Dec. 9, 2021. The entire disclosure of the above application is incorporated herein by reference.

The present invention refers to a wire electrical discharge machining method, in particular to a method for the application of an arbitrary discharge pattern to the workpiece cutting surface by wire electrical discharge machining.

BACKGROUND OF THE INVENTION

Technical Field

In wire electrical discharge machining, referred to as WEDM, a desired contour is cut in a workpiece by means of a wire electrode (wire). Wire and workpiece are moved relatively to each other according to the instructions of a machining program. The process is conducted by applying discrete electrical pulses to the gap between wire and the workpiece. The workpiece material is removed by the action of electrical discharge pulses, also referred to as discharges, sparks, or pulses. General information about the EDM process is available for instance in F. Klocke, W. König, Fertigungsverfahren 3: Abtragen, Generieren and Lasermaterialbearbeitung, 4., neu Bearb. Aufl., vol. 3. Berlin: Springer, 2007.

Discussion

Thanks to constant further development, the WEDM process is competitive and economically attractive, especially for demanding machining tasks. Recently, company GF Machining Solutions has presented the intelligent Spark Protection System (ISPS), that is, a process control method in which the overall spark distribution is monitored in real time, and the pulse energy is reduced if the spark density at any position exceeds certain thresholds (see EP3446820A). This procedure makes use of the information about the position of the discharges along the engagement line of wire and work piece, which is detected by measuring the partial currents fed to the wire electrode through an upper and a lower current feeding path. The position of the discharges is then concluded from said partial currents.

The method to detect the location of a discharge using the discharge pulse signals has been first disclosed by Dr. Kiyoshi INOUE, in his patent application publication JPS5364899A [Nov. 22, 1976]. The method consists in measuring the resistance of the electrode wire between the location of the electrical discharge and one of the contacts supplying machining current to the electrode wire. If an accumulation of discharges is detected at the same point, countermeasures can be initiated and damage to the wire electrode and workpiece can be prevented.

Several similar methods and enhancements have been proposed since then. MARTIN CH653585A5 [Sep. 7, 1983] discloses a method to compute the distance Z of an electric discharge along the portion of the wire electrode in the machining zone between the electrode wire and the workpiece, said distance being indicated from the center point between the current feeding contacts, the method including subtracting and adding the intensities of the currents flowing respectively in each of an upper and a lower line, in the course of each electrical discharge, and a circuit for obtaining a value which is proportional to the quotient of the subtraction by the addition. The measurement of the discharge position is used for monitoring the thermal load of the wire and to prevent wire breakage due to a concentration of discharge. This document further suggests measuring the current within the generator.

Most of the known methods related to discharge position detection use the detected positions for one or more of the following: to prevent concentrated discharges, to avoid wire breaking or damages to the workpiece by spotting consecutive discharges occurring at the same location, to determine the distribution of discharges, to improve the shape of a workpiece surface, e.g. the straightness.

Most notably, certain methods disclose to not only to measure the position of a current discharge, and to control the application of a follow-up pulse, but further suggest to control the discharge at the present discharge location, in real time. In fact, a subsequent discharge takes place at the same location if there is not enough time for the spark gap to restore the dielectric strength. This residual ionization, which exist for few hundred nanoseconds after pulse interruption, makes it possible to execute a second discharge at the same place. This opens up completely new possibilities, expanding the applications for the WEDM process.

In particular, JPS63288627A by KISHI discloses a method in which the position of successive discharges along the wire is measured in known manner; the generation of a deposit of wire material is suppressed by detecting the discharge position in real time and stopping a current pulse for a predetermined time when the discharge position reaches a pre-set position.

JPH0386427A by SUZUKI detects the position of an auxiliary pulse and decides actively if a present main pulse is applied, or reduced, or suppressed, in real time. An auxiliary pulse power supply generates a low current pulse for a discharge point location detection.

JPH08294821A by FURUYA suggests to apply different machining parameters to specific portions of the workpiece height, by detecting the position of a present discharge pulse and applying a pre-set machining pulse in the continuation of the same discharge pulse. The control device selects an optimal discharge condition, which fits for its position, based on a signal from the discharge position detecting device.

U.S. Pat. No. 7,638,726 by HASHIMOTO discloses a method in which the discharge position is detected in known manner, by subtracting the currents. Moreover, a present main discharge pulse is controlled on the basis of the position of a present preliminary voltage pulse. This technique is used to recognise and correct the shape of a workpiece, for instance to compensate for an uneven material removal at the center of the workpiece with respect to the upper and lower regions of the workpiece. In certain embodiments, the machining energy is adjusted as a function of the Z-position. This feature is used, for instance to get different roughness in Z direction, to selectively machine the workpiece at a certain position in Z, or to machine a stacked workpiece with dedicated machining parameters.

SUMMARY OF THE INVENTION

A technical objective of the present invention is to provide a WEDM method with an improved machining flexibility. A particular aspectof the present invention is to provide a method to produce a desired pattern at the current cutting surface of a workpiece. Another technical aspect of the present invention is to convert a desired, arbitrary 2-dimensional pattern in a format, which can be interpreted by the control unit of the wire electrical discharge machine.

A first aspect of the present invention is addressed to a WEDM method by which a desired pattern is formed on the current cutting surface of a workpiece. In other words, the surface of the workpiece is textured according to a desired pattern, e.g. while cutting by WEDM.

This is achieved by determining the position of a machining discharge pulse using appropriate discharge position detection determining techniques, and by selectively applying an additional machining discharge pulse.

An additional machining discharge pulse is applied if a detected discharge position of the first machining discharge pulse is tagged as to be processed by the additional machining discharge pulse. The discharge positions, which have to be processed by the additional machining discharge pulse are designated by a digital pattern representing the desired pattern.

Other aspects of the present invention relates to a method by which the digital pattern is stored.
The method includes the provision of a storage for the digital pattern. According to the preferred embodiment of the invention, the storage includes a memory array, preferably a linear array, a rectangular array or a triangular array.

In a further aspect it is shown how the instructions for the generation of the desired pattern are imparted to a wire electrical discharge machine. Hence, the cells which shall be processed by at least one additional machining discharge pulse are designated accordingly in said memory array, and/or the cells which shall be processed only by the first machining discharge pulse are designated accordingly.

Further aspects are set forth in the dependent claims, the following description and the drawings. Other features are inherent in the methods and products disclosed or will become apparent to those skilled in the art from the following detailed description of embodiments and accompanying drawings.

DRAWINGS

Figure 2A:
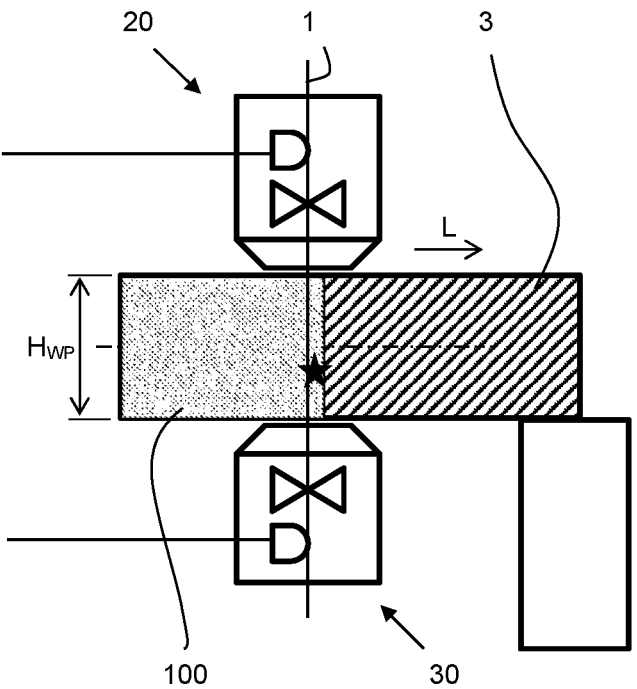
Figure 2B:
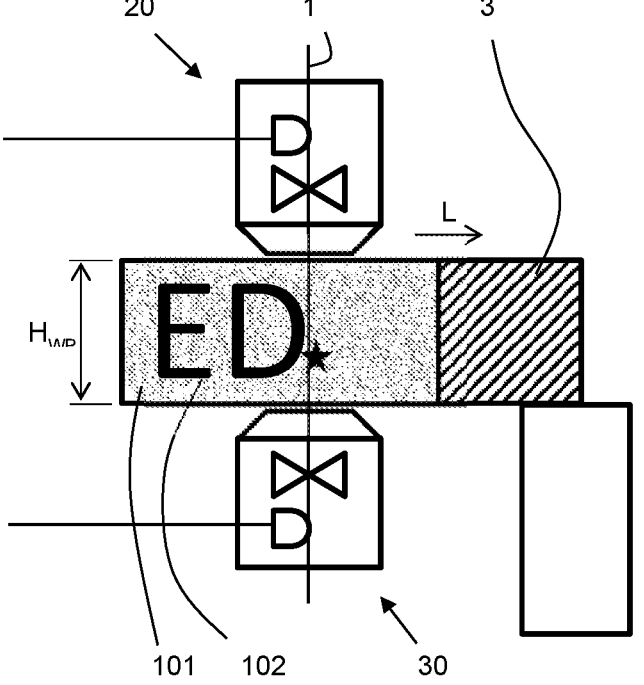
Figure 3:
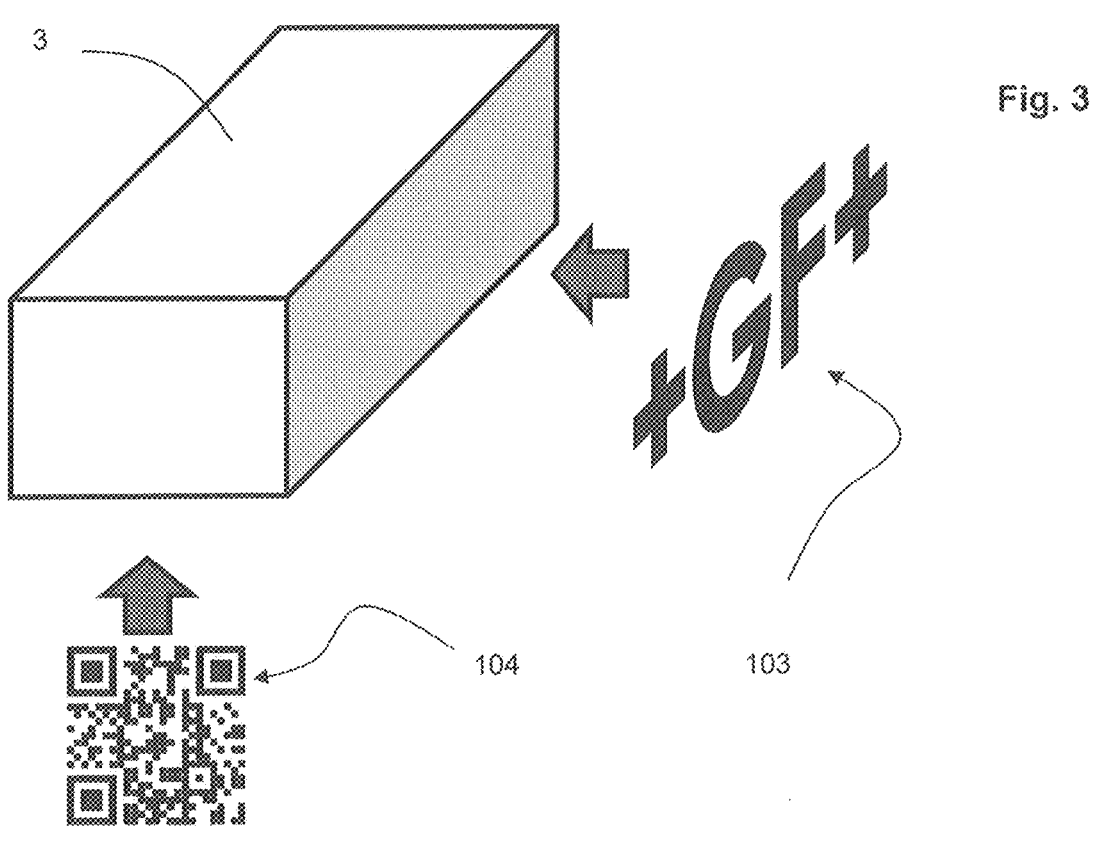
Figure 4:
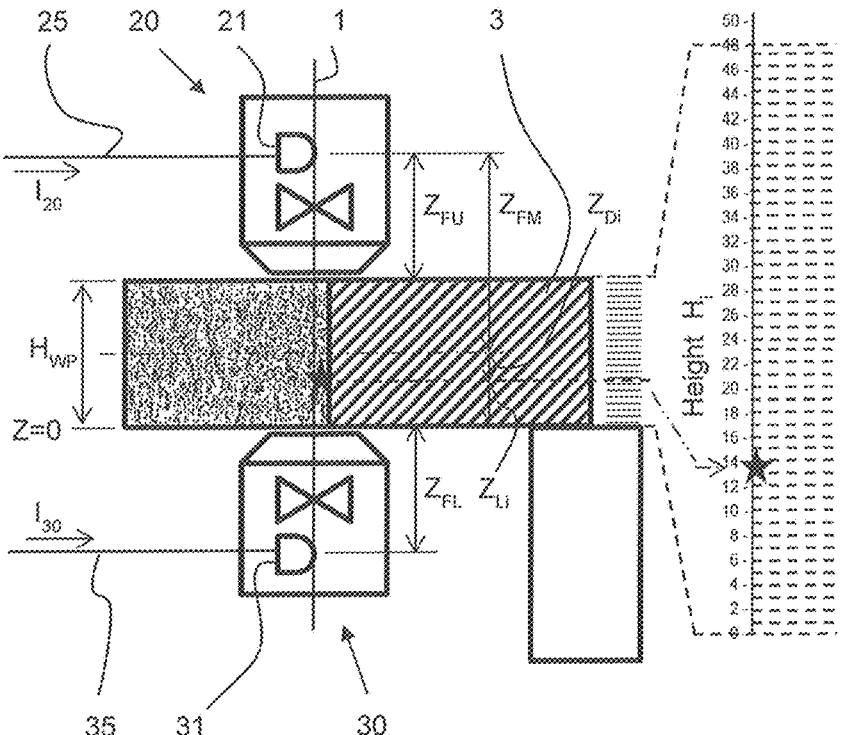
Figure 5A:
Figure 5B:
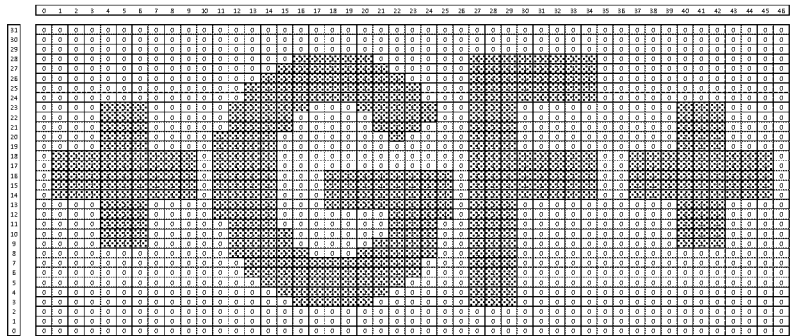
Figure 5C:
Figure 6:
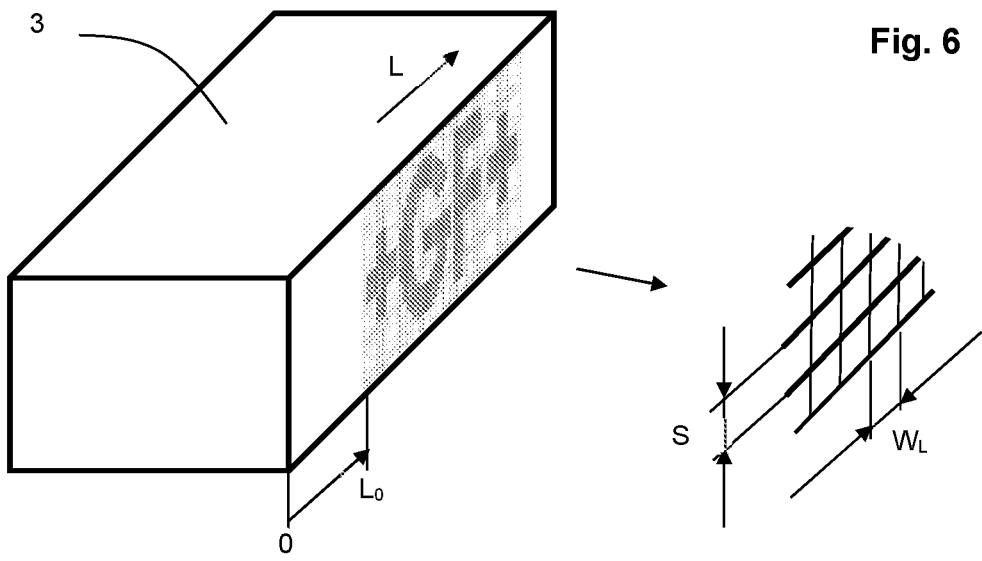
Figures 7A, 7B:
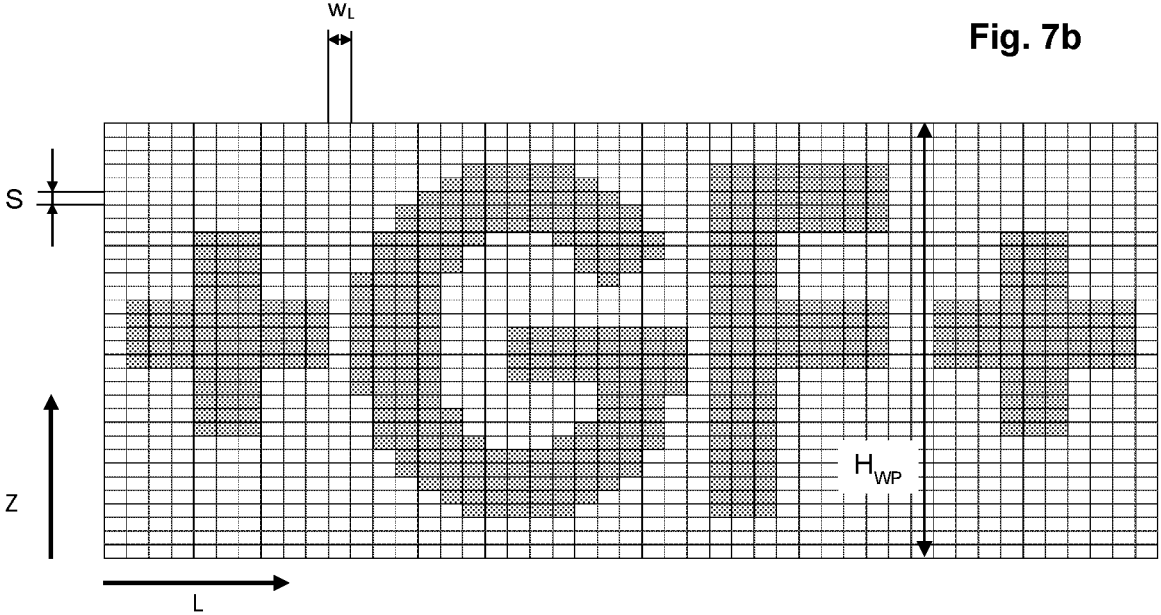
Figure 8A:
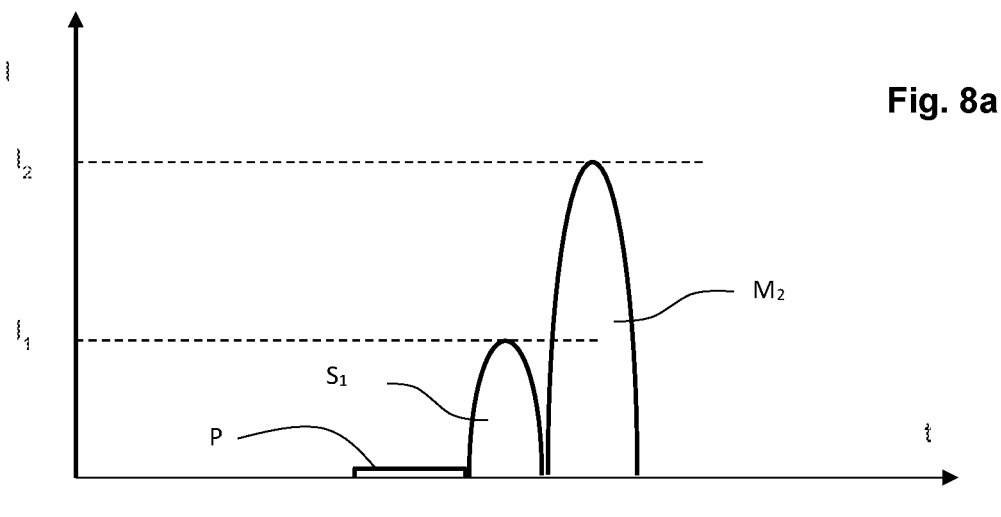
Figure 8B:
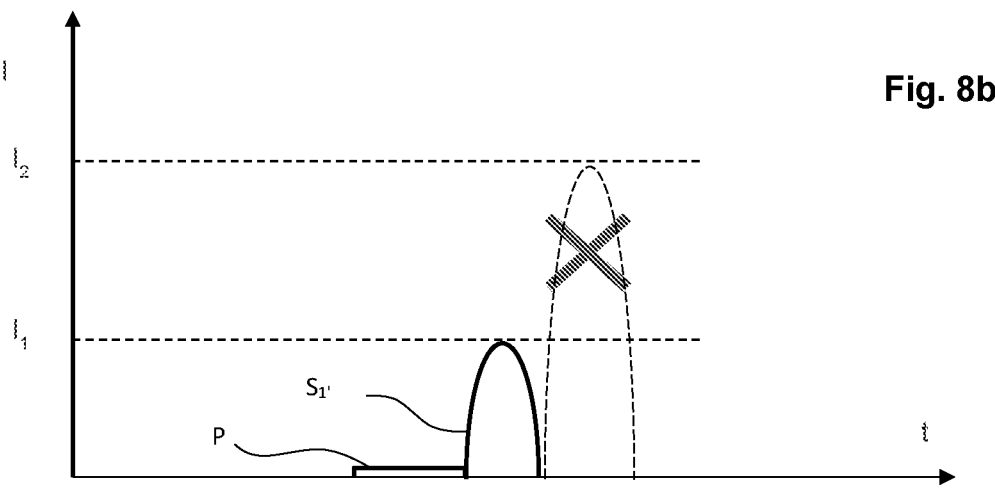
Figure 8C:
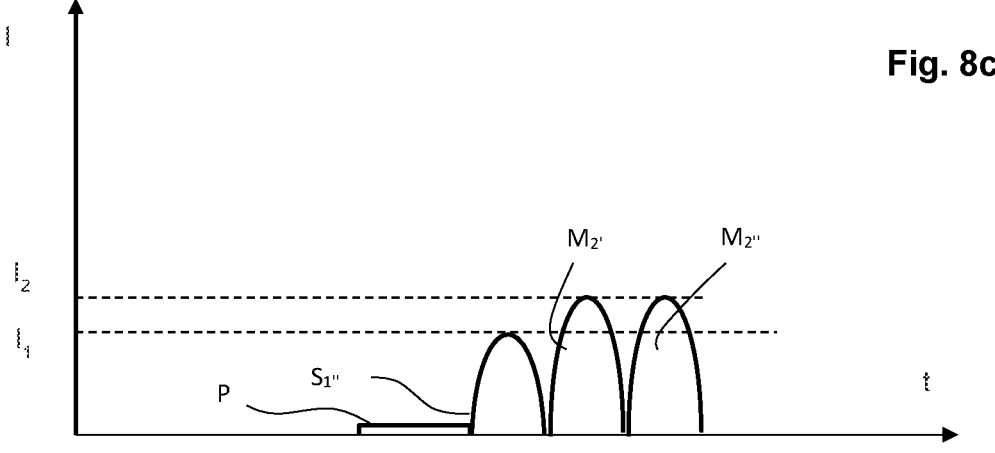
Figure 9:
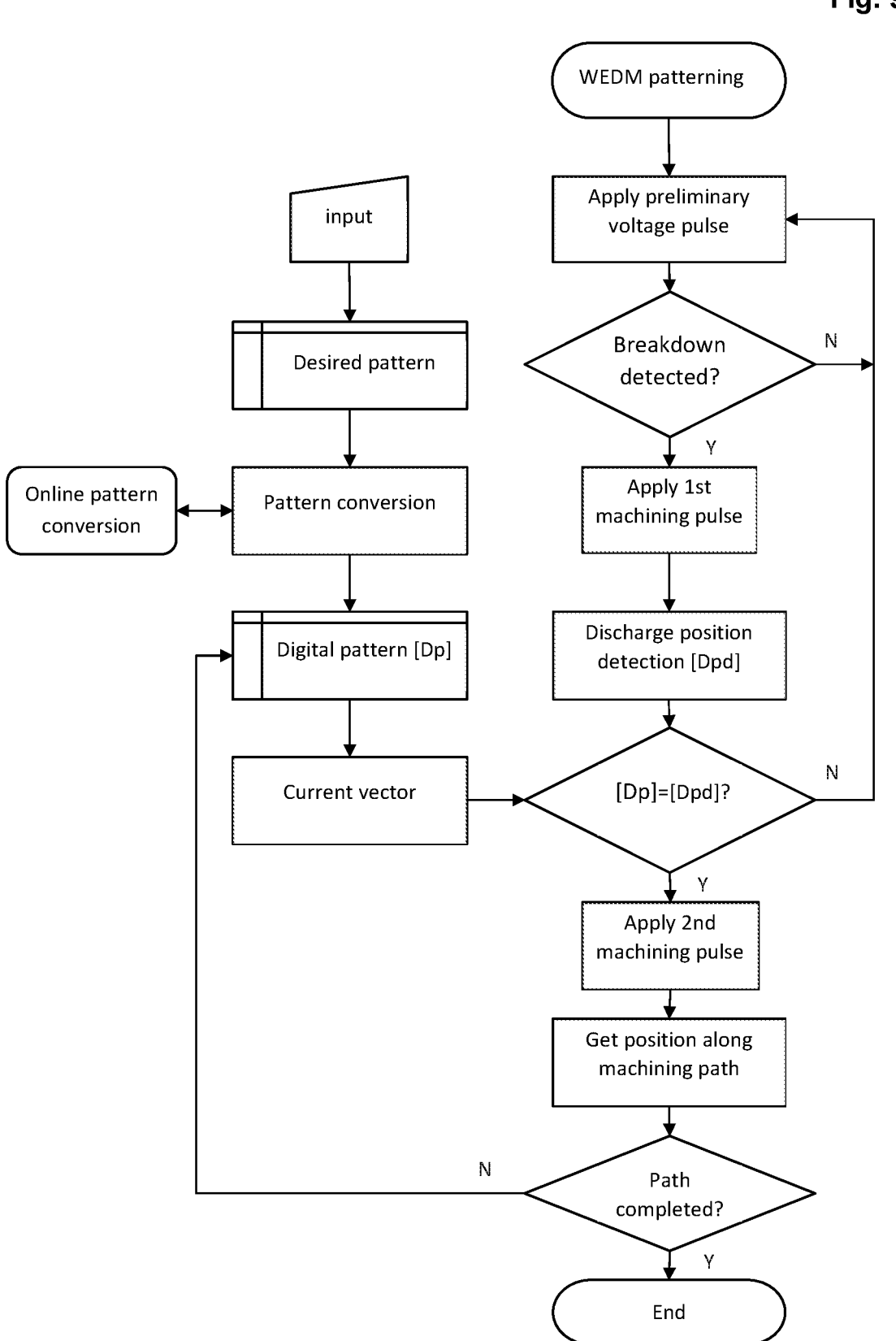

Preferred embodiments of the invention will now be detailed with reference to the attached drawings, which illustrate the following:

FIG. 1 is a sketch of wire traveling circuit and machining area of a known wire electrical discharge machine, FIG. 2a is a sketch of a work piece, which is processed by conventional wire electrical discharge machining, FIG. 2b is a sketch of a work piece, which is to be labelled by wire electrical discharge machining, FIG. 3 shows two exemplary desired patterns to be imparted on a workpiece, FIG. 4 is a known discharge position classification scheme FIG. 5a is one example of a desired pattern, FIG. 5b is one example of a digital pattern, FIG. 5c is one example of a physical pattern, FIG. 6 illustrates the position of the pattern along of the machining path, FIG. 7a illustrates storing the digital pattern in a 2D-array, FIG. 7b illustrates the size of the pattern at the workpiece, FIGS. 8a, 8b and 8c illustrate exemplary machining discharge pulses used by the invention, FIG. 9 is a flowchart illustrating the WEDM patterning.

DESCRIPTION OF PREFERRED EMBODIMENTS OF THE INVENTION

FIG. 1 illustrates a part of a wire electrical discharge machine known in the art, in particular a wire traveling circuit and a machining area. A workpiece 3 is mounted on a machine table 6. The workpiece 3 and a wire electrode 1 are moved with respect to each other in an X/Y-plane. The wire electrode can be tilted with respect to the vertical axis, Z-axis, e.g. by relative displacement in the U/V-plane of the upper wire guiding head 20. The wire upper- and lower wire guiding head 20, 30 respectively comprise a wire guide 22, 32, a current feeder 21, 31. The discharge pulses provided by a pulse generator 7 are supplied to the wire electrode 1 by means of an upper- and a lower current cable 25, 35.

The wire electrical discharge machine according to the preferred embodiment of the invention comprises a discharge position detection circuit, which for instance is based on the partial discharge currents method. Such circuit includes, for instance, an upper- and a lower toroidal current transformer 26, 36 for the measurement of the partial currents $I_{20}$, $I_{30}$ by which a discharge position can be determined.

The position of the discharges occurring along the engagement line of wire and workpiece is discretized in known manner, for evaluation, recording and for further use. FIG. 4 shows an example of discretization, with a discharge position classification scheme. A workpiece height $H_{WP}$ is divided into 48 vertical sections starting from the lower edge of the workpiece (Z=0), and assigning a discharge to the respective vertical section. For instance, the present discharge shown in the figure is ranged in vertical section 14.

According to known art, it is possible to decide, whether a further machining discharge pulse shall be supplied at the same position where a present electrical discharge is detected. This can be used, for instance to process stacked workpieces or layered materials requiring different machining parameters for e.g. different materials. However, known methods provide no flexibility with regard to the structuring, respective texturing of the cutting surface. In particular, prior art provides no instruction on how to apply a desired pattern to the cutting surface by wire electrical discharge machining, especially, the desired pattern being a 2d-dimensional pattern.

In a wire electrical discharge machining (WEDM) method for forming a desired pattern on a workpiece according to one embodiment of the invention, a preliminary voltage pulse is applied to a gap between a wire electrode and a workpiece, and at the breakdown of said preliminary voltage pulse, a first machining discharge pulse is applied to the wire, and a discharge position of said first machining discharge pulse along the engagement line of the wire electrode and the workpiece is determined in real time based on the voltage signals and/or current signals generated by said first machining discharge pulse, and at least one additional machining discharge pulse is selectively applied directly after the first machining discharge pulse, whereby said selective application of the additional machining discharge pulse is based on the determined discharge position and based on a digital pattern, representing the desired pattern in a machine readable format.

Thus, the method starts by applying a preliminary voltage pulse between the wire electrode and the workpiece. This preliminary voltage pulse of e.g. 100V is to induce a breakdown, and has a low pulse energy.

At the detection of the breakdown provoked by said preliminary voltage pulse, a first machining discharge pulse is applied to the wire, through an upper- and/or a lower current feeding path. The breakdown is detected in known manner, e.g. by detecting a falling edge of the gap voltage falling below of a breakdown detection threshold level, at e.g. 60V.

Then, the position of the discharge induced by the first machining discharge pulse along the engagement line of the wire electrode and the workpiece is determined in real time based on electrical signals generated by said first machining discharge pulse, e.g. voltage signals and/or current signals. For instance, the partial discharge currents of said first machining discharge pulse in an upper- and a lower current feeding branch can be used to determine the discharge position. This detection is made e.g. by applying the first machining discharge pulse.

Lastly, at least one additional machining discharge pulse is selectively applied directly after the first machining discharge pulse, before full deionization of the gap, typically less than 1 μs, preferably less than a few hundred nanoseconds after the first machining discharge pulse. By applying the additional machining discharge pulse very shortly after the first machining discharge pulse the gap is still partially ionized, and the additional machining discharge is very likely to occur at the same position of the discharge induced by the first machining discharge pulse. Said selective application of the additional machining discharge pulse is based on the determined discharge position and based on the digital pattern, which in turn is derived from the desired pattern, in particular digitized pattern of the desired pattern. By using this method, the desired pattern can be textured on the workpiece by discharges.

At least one additional machining discharge pulse is applied, if the discharge position detected should be textured to form the physical pattern on the workpiece. No additional machining discharge pulse is applied, if the discharge position detected should not be textured to form the physical pattern on the workpiece.

The positions at which at least one additional machining discharge pulse is applied is determined in accordance with the digital pattern. Decision about selectively applying the additional discharge pulse is made in real time, instantaneously, based on the determined discharge position of the first discharge pulse and the digital pattern.

In particular, the selective application of the additional machining discharge pulse is controlled by a control unit of the machine tool.

FIGS. 2a and 2b illustrates the situation of machining the workpiece. FIG. 2a shows a workpiece which is cut using a conventional cutting method, e.g. a main cut. The machining discharge pulses are not released selectively as a function of the discharge location and the crater landscape of cutting surface 100 is substantially uniform.

FIG. 2b shows the situation in which the desired pattern is machined on the cutting surface of the workpiece. Here, the machining discharge pulses are controlled as a function of the discharge location. The desired pattern is generated e.g. in the course of a second cut, after the main cut. The surface is processed by a first machining discharge pulse, generating a "background" cutting surface 101, and is selectively processed by a second machining discharge pulse, at the designated positions, generating the patterned surface 102.

The cutting surface on which the digital pattern is to be applied may be a straight, vertical surface of the workpiece, however it may be more complex, e.g. a curved geometry, a tapered surface, a variable taper surface, a surface having variable height (steps, holes, etc.), or combinations thereof, etc. Moreover, the cutting surface may present corners or other discontinuities, e.g. it may be composed of two or more sides of a workpiece.

FIG. 5a is an exemplary image of a desired pattern to be formed on the workpiece. The file is provided e.g. in the Portable Graphics Format (.png), i.e. an uncompressed raster image format. The desired pattern is provided e.g. as an image as shown in FIG. 5a and converted into the digital pattern shown in FIG. 5b, such conversion can be realized for example using a program, which may be a local program or an online conversion tool like "pixel beads". The digital pattern includes a number of pixels, each of which is assigned a pixel data, such as a number 1 or 0 shown in FIG. 5b, representing the image information. In further, the pixel data can include a colour. The digital pattern has a plurality of columns and a plurality of rows. For example, the digital pattern shown in FIG. 5b features 47 columns and 32 rows and 47×32 pixels. The digital pattern is accessible by the control unit as control information to conditionally apply the additional discharges to generate a corresponding physical discharge pattern shown in FIG. 5c. For example, when the pixel data having the number "1" is read by the control unit, the additional discharge should be applied while the pixel data having the number indicates that no additional discarge should be applied.

According to an embodiment, the method includes that the digital pattern is stored in a primary storage of the machine tool, and the primary storage is directly accessible by the control unit.

According to an embodiment, the primary storage includes a memory array to store the digital pattern, preferably a linear array or a plurality thereof, a rectangular array (a matrix) or a triangular array.

For instance, the memory array may be a linear array, i.e. a one-dimensional array or vector. Thus, a succession of vectors provides a matrix-like storage. A vector corresponds to a single column of a matrix.

Alternatively, the memory array may be a rectangular array, i.e. a two-dimensional array, or matrix. Such two-dimensional array comprises a plurality of columns and a plurality of rows.

Other memory arrays are possible, for instance a triangular array. In general, the memory array must be suitable to receive the digital pattern. The memory array may also include one or more additional dimensions. For instance, a 3-dimensional array may be provided, where the third dimension is used, e.g. to specify the number of additional machining discharge pulses to be applied at a current cell, or store machining parameters defined for different discharge position.

Additionally, the memory array is a fast first-level memory such as registers in a FPGA or registers or cache memory in a micro processing unit. According to an embodiment, the digital pattern is stored in said memory array by storing the pixel data in the memory array cells.

For example, the cells of the memory array which shall be processed by at least one additional machining discharge pulse are designated with e.g. a number "1", and/or the cells of the array which according to the digital pattern shall be processed only by the first machining discharge pulse are designated by e.g. a number "0", as shown in FIG. 5b.

The primary storage for the digital pattern serves to designate the cells in which an additional machining discharge pulse is selectively applied. By designating the cells of the memory array, a relative positional information, where to apply an additional machining discharge pulse along the engagement line of wire and workpiece, and along the machining path is stored. Said memory array may comprise further parameters related to the desired discharge pattern, e.g. a value representative of the designated pulse energy. Complementary information which is required to define the size and the position of the physical pattern at the workpiece is illustrated further down.

The digital pattern is transferred to said memory array, to designate those cells of the array which have to be processed by at least one additional machining discharge pulse, or the other way around, to designate those cells of the array which have to be processed only by the first machining discharge pulse, or to designate both.

According to an embodiment, at least one additional machining discharge pulse is applied, if the discharge position of a first machining discharge pulse is detected at a position corresponding to a designated cell of the memory array, in particular if the pixel data of this designated cell is for example "1".

This means that the discharge position induced by the first machining discharge pulse along the engagement line of wire and workpiece is detected, and compared with the digital pattern stored, and, if the detected position matches with the position of a memory array cell which has been designated with e.g. the number 1 in the example shown in FIG. 5b, then the at least one additional machining discharge pulse is applied.

In one embodiment, a secondary storage is provided to store the digital pattern and/or desired pattern before the machining. The secondary storage can be a storage having large storage capacity. However, such storage is normally comparably slow. In order to enable the control unit to fastly access the digital pattern, the digital pattern can be transferred during machining or shortly before machining from the secondary storage into the primary storage, partially, e.g. vector by vector, or entirely. Since the additional machining discharge must be applied directly after the first machining discharge, the time to decide if the additionally discharge should be applied is very short and e.g. less than 1 μs, thus, the control unit must be able to access the digital pattern very fastly to decide if the additional discharge should be applied.

In particular, the secondary storage is aimed to store a plurality of digital patterns. This storage may be for instance a storage of the control unit or a storage accessible by the control unit, e.g. via LAN. When one particular digital pattern should be machined on the workpiece, this particular digital pattern can be shortly before machining transferred into the memory array, or be transferred into the memory array during the machining, e.g. vector by vector to ensure a fast access to the digital pattern.

In one preferred variant, the machine tool comprises a processor e.g. a FPGA (field-programmable gate array), for the real time control of the selective application of the additional machining discharge. The same FPGA may be used to discretize the detected discharge positions. The FPGA includes an FPGA-internal memory array like registers as the primary storage. During the machining, the digital pattern is transferred from the secondary storage to the registers, either entirely or partially, e.g. one or more vectors at a time and can be fastly accessed by the control unit to determine if the additional discharge should be applied or not. The digital pattern is processed and applied at the desired vertical position while moving along of the machining path. In this way, the desired pattern can be formed respectively textured on the current machining surface.

The WEDM machine works like a kind of printer, where the additional discharge pulses are selectively applied, additional material is removed and a portion of the pattern is formed. The first machining discharge pulses and the additional machining discharge pulses are applied along the engagement line of wire and electrode while the wire moves along the machining path. Thus, an arbitrary 2-dimensional pattern can be formed on the workpiece, e.g. in a single dedicated pass.

One can imagine applying a grid on the surface of the workpiece on which one wants to apply the pattern. The workpiece height can be divided into vertical sections for the discretization of the discharge positions as for example disclosed in EP3446820A, and the portion of the machining path on which the pattern shall be applied is divided into a number of horizontal sections having length $W_L$. The number of vertical sections times the number of the horizontal sections corresponds to the number of pixels of the digital pattern.

Thus, in a preferred embodiment, the discharge position is discretized by dividing the workpiece height $H_{WP}$ into a number $N_S$ of vertical sections S of the workpiece and a number of rows of the digital pattern is set to be the same or a multiple of the number $N_S$ of vertical sections S.

In fact, the vertical patterning resolution is limited by the resolution of the discharge position detection, e.g. by the number of discrete vertical sections. Accordingly, also the reproduction accuracy of the digital pattern is limited by the resolution of the discharge position detection. Thus, the memory array may advantageously feature the number of rows equivalent to the number of vertical sections of the discharge position detection system, or a multiple of said number $N_S$.

Alternatively, the current discharge position of the first machining discharge pulse can be defined as an absolute discharge position, with reference to a workpiece reference, e.g. the bottom surface of the workpiece, and the at least one additional machining discharge pulse may be released if the detected absolute discharge position, e.g. rounded up to the full millimetre, is designated for the selective application thereof.

In contrast to the vertical patterning resolution, the horizontal patterning resolution is not limited by the discharge position detection system. The limitations in horizontal direction (in cutting direction, along the path) are determined by the resolution of the positioning system and by the size of the generated craters.

FIG. 7a illustrates storing a digital pattern having a size of 47×32 pixels with 47 columns and 32 rows in the primary storage, such as in the memory array. FIG. 7b shows the same digital pattern at the cutting surface of the workpiece. The rows designate the positions in a vertical direction Z of the cutting surface of the workpiece, and the columns designate the positions in the horizontal direction L of the cutting surface of the workpiece (the cutting direction, machining path). A horizontal section length $W_L$ designates the width of a column of the physical pattern at the cutting surface of the workpiece, e.g. in millimetres. The horizontal section length $W_L$ is defined in cutting direction, along the path L, so that the horizontal section length times the number of columns corresponds to the size of the pattern in cutting direction.

In a preferred embodiment, the horizontal section length $W_L$ is defined in a cutting direction along the machining path, whereat a global horizontal section length $W_L$ is defined for all columns of the digital pattern, or an individual horizontal section length $W_{Li}$ is defined for each column of the digital pattern.

The height of the row is determined by dividing the workpiece height $H_{WP}$ into a desired number of rows. Preferably, the number of rows correspond to the number $N_S$ of vertical sections S used for the discretization of the discharge positions. In the example of FIGS. 7a and 7b the number of rows of the digital pattern and the number of vertical sections used for the discretization of the discharge positions is the same, e.g. 32. Here the pattern is formed over the entire workpiece height $H_{WP}$. Assuming for instance a workpiece height of 40 mm and 32 vertical sections, and 47 columns having a horizontal section length $W_L$ of 2 mm, the size of the physical pattern and the resolution of the physical pattern is entirely defined.

Preferably, the height-to-width ratio of the physical pattern corresponds to that of the desired pattern.

Knowing the height of the vertical sections S, e.g. the workpiece height $H_{WP}$ divided by the number of vertical sections $N_S$, the suitable section length $W_L$ can be calculated by the multiplication of the height of the vertical sections S times height-to-width ratio of the desired pattern.

In a preferred embodiment, the horizontal section length $W_L$ is computed from the product of the height of the vertical sections S times a height-to-width ratio of the desired pattern. This ensures that the physical pattern is not stretched or compressed.

Moreover, the position of the digital pattern at the surface of the workpiece is specified, for instance as shown in FIG. 6, by providing the position of the starting point $L_0$ of the pattern, e.g. along the machining path L. In an embodiment, a starting point $L_0$ of the pattern is defined along of the machining path, preferably from the origin of the machining path.

With reference to FIG. 7a, the pixel data stored in the cells which shall be processed by a first machining discharge pulse and by an additional machining discharge pulse are designated with a "1", whereas the pixel data stored in the cells which shall be processed only by the first machining discharge pulse are designated with a "0". Assuming that the wire is currently at column 25 (corresponding to a certain position along of the machining path), cells at the column 25 and rows from 12 to 16 shall be processed by a first machining discharge pulse and by an additional machining discharge pulse $M_2$, as shown e.g. in FIG. 8a. The remaining cells of column 25 (0 to 11 and 17 to 31) are processed only by the first machining discharge pulse $S_{1'}$, as shown e.g. in FIG. 8b.

For instance, as shown in FIG. 8a, P indicates the small current induced by the preliminary voltage pulse. The discharge position of a first machining discharge pulse $S_1$ is detected at a vertical section whose corresponding position of the memory array was designated for the application of an additional machining discharge pulse, thus a machining discharge pulse $M_2$ is applied directly after the first machining discharge pulse $S_1$. In the example of FIG. 8b, the discharge position of a first machining discharge pulse $S_{1'}$ is detected at a vertical section whose corresponding position of the memory array was not designated for the application of an additional machining discharge pulse, thus it is omitted. FIG. 8c shows another example in which the discharge pulse $S_{1''}$ is detected at a vertical section whose corresponding cell of the memory array was designated. Here, additional machining discharge pulses $M_{2'}$ and $M_{2''}$ are applied immediately after the first machining discharge pulse. Applying a further additional machining discharge pulse can generate different surface characteristic and therefore obtain special optical and/or functional effect.

When the wire electrode reaches the starting point $L_0$ of the pattern, the first column of the digital pattern is transferred into the memory array, e.g. the register of the FPGA. When the discharge position is determined, the FPGA accesses the first column of the digital pattern from the memory array and compares with the determined discharge position to determine if an additional machining discharge should be applied. Preferably, the FPGA and/or a PCB (printed circuit board) comprising the FPGA is a component of the control unit. The pattern is formed on the workpiece, column by column in the horizontal direction. For example, when the wire electrode reaches the start position of the second column, the second column of the digital pattern is transferred e.g. from the secondary storage into the memory array, e.g. the fast register embedded in FPGA. If the determined discharge position is in the vertical section corresponding to the row with the one of the numbers of 14 to 18, the additional discharge must be applied, since the pixel data of the corresponding pixels at these positions are "1". If the determined discharge position is in the vertical section corresponding to the row with the number of 0 to 13 and 19 to 31, no additional discharge is applied, since the pixel data of corresponding pixels at these positions are "0".

In the preferred variant, the wire electrode constantly moves in the machining direction.

Once the first column of the digital pattern has been formed to the workpiece surface, the second column of the digital pattern is read into the memory array, and so on, until all columns of the digital pattern have been processed.

FIG. 2a shows a workpiece, which is processed by conventional wire electrical discharge machining, generating a uniform cutting surface 100 by the substantially similar discharge craters. FIG. 2b, shows an application of the invention, in which the physical discharge pattern 102 is formed at the cutting surface based on the digital pattern. The base surface structure 101 is generated by a first machining discharge pulse, and the letters "E" and "D" are generated by the additional machining discharge pulse which are selectively applied according to the digital pattern. The additional machining discharge pulse may have much higher energy than the first machining discharge pulse, so that the surface topography in the regions of additional machining discharge pulses will be comparably rough and thus visible.

According to the above example, the machined surface comprises only two surface structures, that is, the base surface structure 101 and the surface structure of the physical pattern 102. However, it is possible to generate a plurality of base surface structures and/or a plurality of surface structures for the physical pattern 102.

In practice, the machining parameters determining the surface structure (e.g. roughness) are selected from available machining parameters. For instance, a setting may be selected to get a comparably weak, shallow base surface structure, and another setting may be selected for the physical pattern 102, to get a comparably intense, rough texture. In this way, the contrast effect is increased, and the visibility of the pattern is improved. For instance, the roughness of the surface is mainly influenced by the machining current pulse amplitude and duration, by the number of consecutive pulses of a type, etc. Moreover, it is possible to define texture transition, e.g. by defining an initial setting in the first column and a final setting in the last column. In this way it is possible to produce various effects, e.g. a smooth texture transition from a rough to a fine texture.

According to an embodiment, the desired pattern is provided as an image file or as a spreadsheet program file. For instance, the image is provided in a raster image format, e.g. a bitmap, or a vector file format. For instance, the spreadsheet program file is an Excel-file. An Excel-file can be used e.g. to represent the locations and the current amplitude of the discharge pulses, for every point in an L/Z-space, where L is the machining path and Z is the position along the engagement line of the wire.

According to an embodiment, the cells of memory array to be processed by at least one additional pulse are designated by the operator.

For example, this can be done by the operator by entering directly the desired pattern in a spreadsheet program file. Such spreadsheet program file has, e.g. the size of memory array, indicating e.g. the cells to be processed by an additional machining discharge pulse. Moreover, the operator can directly input the pattern through the keyboard, mouse, or other input device, e.g. to input letters as a pattern or draw a figure as a pattern.

According to another embodiment, a conversion program reads the desired pattern and convert the desired pattern into the digital pattern.

Generally, the original desired pattern to be applied to the workpiece is provided by means of a computer file and specified therein. For instance, the desired pattern is originally available as a bitmap, and said bitmap is interpreted by the conversion program, providing e.g. a sequence of vectors in which the cells to be processed by at least one additional pulse are designated. For example, a bitmap including only black and white bits is given; the black bits are interpreted e.g. as regions which have to be processed by at least one additional machining discharge pulse, whereas the white bits are processed only by the first machining discharge pulse.

Preferably, the user can define or adjust the size and the position of the digital pattern.

According to an embodiment, the conversion program is embedded in a part program editor, which is installed in a control unit of the wire electrical discharge machine or in a separate workstation. The part program editor may include a module dedicated to the creation and management of digital patterns.

Preferably, the workpiece and/or the machining path with the digital pattern are shown on the display of the control unit. In this way, the user gets a visual feedback of the pattern on the part. He may decide where to generate the desired pattern along the machining path, and adjust the position and/or the size of the pattern, if needed.

According to another embodiment, the functions listed here above are featured by a CAM-system, including a module to create and manage digital patterns, or to convert a desired pattern and to fit the digital pattern at a designated surface of a workpiece.

According to a further embodiment, the discharge energy and/or discharge type of the first machining discharge pulse and/or the discharge energy and/or discharge type of the at least one additional machining discharge pulse and/or the number of additional machining discharge pulses is specified in the digital pattern.

The digital pattern stored in the primary storage and/or secondary storage can therefore contain additional information that goes beyond the mere indication of the position on the workpiece, where at least one additional discharge should take place. In particular, pixel data may comprise pulse control data. In particular, pulse control data comprise information about discharge energy and discharge type of the first machining discharge pulses, and information about discharge energy, discharge type and number of additional machining discharge pulses may be provided therein. In this way, a map of the machining parameters to be used is provided, in particular, the map includes a mapping of the machining pulse energy.

The discharge energy is determined in particular by the current amplitude and/or duration of the discharge current pulse. Discharge type includes for instance discharge current pulses of various shape.

Example: a defined discharge energy and a defined discharge type is used for the first machining discharge pulses, which is used to determine the position of the first discharge pulse, and a defined discharge energy and defined discharge type is used for the additional machining discharge pulses. In this example, the pattern generated thereby has thus only two surface structure types: the first type is generated by the first machining discharge pulses alone, and the second is generated by the first machining discharge pulse followed by an additional machining discharge pulse which is generated at the same place, i.e. at the cells which were designated to be processed by at least one additional discharge pulse.

According to another example, a defined discharge energy and defined discharge type is used again for the first machining discharge pulses, but for the additional machining discharge pulses two different discharge energies and a defined discharge type is used, selectively. Here the energy of the two additional machining discharge pulses, having e.g. different current amplitudes are specified in the sequence of vectors, in accordance with the desired pattern. In this case, the first machining discharge pulse generates a first surface structure type, and the additional machining discharge pulses generate two additional surface structure types.

A plurality of different settings can be used to generate a variety of surface structure types. In principle, every cell of the memory array can store particular settings for discharge energy, discharge type and/or number of the additional machining discharge pulses.

According to a further embodiment, the conversion program is configured to assign the discharge energy and/or discharge type of the first machining discharge pulse and/or the discharge energy and/or discharge type of the at least one additional machining discharge pulse and/or the number of additional machining discharge pulses, in accordance with an attribute of the desired pattern to the cell of the memory array.

For instance, the desired pattern is originally available as a bitmap with 5 different grey levels, colours, or other pattern attribute. Here the discharge energy to be applied in a cell of the memory array by e.g. the additional machining discharge pulse is set as a function of the respective grey level. In this way, the generation of the digital pattern having a plurality of surface structure types is simplified. The digital pattern may include information about the pattern attributes.

According to an embodiment, the energy of the first machining discharge pulse and/or an additional machining discharge pulse is modulated, by controlling one or more of: the discharge pulse current amplitude, the discharge pulse duration, the shape of the discharge pulse.

According to an embodiment, the digital pattern represents one or more of the following: an identifier, a machine-readable label, a functional pattern, a decorative pattern.

Thanks to the invention, any pattern can be produced on the cut surface of the workpiece permanently. The digital pattern may include an identifier of any type, typically a pattern which is characteristic and which is easy to be identified by human, for instance a pattern including a text, a number, and/or a symbol. The pattern may help the users, customers, etc. to identify the part or a characteristic thereof, which one may want to associate physically to the processed workpiece.

The desired pattern may include a machine-readable label, such as a QR-code, a bar code, and/or an augmented reality marker. Certain desired pattern may thus be preferable for the automatic part identification and/or manipulation. For instance, an AR-marker may be applied to dropout parts, so that their position and their orientation can be detected automatically by e.g. a vision system. The AR-marker may be used by the machine to track the dropout part in the course of an automatic dropout part removal operation, by e.g. a robotic manipulator, which is controlled based on the detected position and orientation of dropout parts. The AR-marker also may help to quickly and easily check if a dropout part constitutes an obstacle for the progress of WEDM machining.

FIG. 3 shows a workpiece 3 and exemplary desired patterns, in particular a label 103 and a QR-code 104.

A functional pattern may be generated to improve e.g. tribological properties. This may be achieved by the generation of e.g. a directional pattern, grooves, dimples pattern, scales pattern. These functional patterns are made by selective subtractive and/or selective additive processing according to the present invention.

Further, ornamental patterns may be imparted to the surface, for instance a chess texture, waves pattern, artistic representations, etc.

Of course, the method may be used for known applications such as to apply dedicated machining parameters as a function of the Z-position, over the entire length of the cutting path. For instance, it may be used to machine a stacked workpiece with dedicated machining parameters for different materials or the like. Moreover, the method may be used to apply comparably smooth main cut and/or first trim cut parameters at the top and/or bottom edge of a punch or die tool processed by WEDM. In this way the surface quality is improved and/or heat affected zone of the edge region is reduced, so that the working life of the punch or die tool is increased.

According to an embodiment, the WEDM process for forming the desired pattern is a subtractive process, an additive process, or both additive and subtractive. In the case of a combination of additive and subtractive process phases, the build-up and removal can occur at the same discharge position or at distinct discharge positions.

SUMMARY

Typically, the pattern is formed by normal i.e. subtractive WEDM processing, where the material is removed from the workpiece by the effect of the machining discharge pulses. Here the machining discharge pulses are characterized by e.g. the different, which lastly generates different crater size and shape. However, by suitable setting of the machining parameters, a deposit of wire electrode material, workpiece material, elements of the processing fluid and/or combinations thereof can be formed at the workpiece. This is achieved e.g. by application of comparably long discharge pulses, by reducing the peak current and/or adapting pulse shape.

An application in which material is selectively deposited according to a desired pattern is, for instance, the fixation of dropout pieces by welding. Here the wire material is partially melted and deposited in the kerf behind the wire, forming a solid bridge, which keeps the dropout piece in place (see e.g. JPS5796724A). According to an embodiment of the invention, it is now possible to secure the dropout piece at the desired positions by welding, precisely. In particular, the vertical positions at which the dropout piece shall be secured by means of welding points can be easily specified. The welding points can be distributed optimally providing a stable fixation. For instance, the fixation of a dropout piece includes at least two welding points, with one of the welding points at the upper edge of the workpiece or in vicinity thereof, and the other of said at least two welding points at the lower edge of the workpiece or in vicinity thereof. By placing a plurality of welding points spaced apart from each other, the stability of the welding is increased, with minimal number of welds.

According to a preferred embodiment, the welding points are not applied to the edge of the workpiece. In this way any damage of the edge itself due to the welding is avoided. Further, this additional degree of freedom in the definition of welding points makes it possible to safely fix a dropout piece e.g. at a single side.

Another application is WEDM coating technology, for instance to form a hard, wear resistant layer e.g. a carbide layer. According the invention the selective generation of a coating according to a desired pattern is thus also possible. In particular, one can exactly define the area of the cutting surface to be conditionally processed. By reducing the area to be coated, the time required to e.g. form such a coating is substantially reduced.

According to an embodiment, a workpiece comprises at least a surface having an existing physical pattern on it, and said surface is further processed by WEDM, whereat the existing physical pattern is recognised by the detection of the discharge positions.

Here the WEDM serves as a "reader" of an existing physical pattern. The machining path is made to run along of the workpiece surface and the positions at which a discharge is detected are recorded. The gap, i.e. the distance between the wire electrode and the surface of the workpiece in a direction orthogonal to the machining path may be servo controlled. Isolated discharges (outliers) are identified and eliminated. The pattern created by the entirety of discharge positions are represented graphically. The existing pattern is recognized. For instance, an existing pattern is compared with reference patterns to identify the exact pattern and/or a pattern category and/or the pattern s submitted to an algorithm that has been trained to identify patterns. In summary, the method can be used to recognise an existing pattern at the cutting surface.

According to an embodiment, an action is carried out on the base of said recognized existing pattern. For instance, certain machining parameters, e.g. the flushing pressure by the upper- and/or lower flushing nozzle are controlled on the base of the recognized existing pattern. For example, the recognized pattern may define the entire technology parameter set to be used to process a given workpiece.

The method can be used to apply a texture to a surface cut by WEDM, with no need for a separate process. The texture can be generated in the course of a main cut, in a trim cut, or in a dedicated texturing cut. A texturing cut is a cut or pass, which is specially dedicated to apply the physical pattern on the workpiece.

The method according to the present invention may be further enhanced by auxiliary provisions, such as the detection of the position of the at least one second discharge pulse. In this way, a feedback is provided for the machine and user to know, whether the pattern is correctly formed or not. For instance, a pulse frequency may be controlled on the base of the position of the first discharge pulse and/or the at least one second discharge pulse, e.g. by reducing the pulse frequency, if in the course of a defined observation period it is determined that a number of first- and/or second discharge pulse have occurred at a position which was not designated for the application of at least one second discharge pulse.

Moreover, in straight sections of the machining path, the wire can be tilted in a cutting direction to generate a slanting effect to the pattern to be imparted. For text type patterns this may be used to get an italic type text style.

FIG. 9 depicts the method according the present invention in a flow chart. After inputting a desired pattern, the conversion program converts the desired pattern into the digital pattern. The digital pattern is stored in the primary storage and/or the secondary storage. For WEDM patterning, a preliminary voltage pulse is first applied. When no breakdown is detected, a new preliminary voltage pulse is applied. When a breakdown is detected, a first machining pulse is applied and the discharge position induced by this pulse is determined. In parallel, a partial of the digital pattern e.g. current column to be formed on the workpiece is transferred into the fast memory array. The control unit accesses the digital pattern from the memory array and compares the determined discharge position with the digital pattern to determine if the additional discharge machining pulse should be applied.

The pattern is formed on the workpiece along the machining path. The position along the machining path can be obtained during the machining to trigger the reading of the pertinent column of the digital pattern and to verify if the machining path is completed.

What is claimed is:

1. A wire electrical discharge machining method (WEDM) for forming a desired pattern on a workpiece by a WEDM machine tool, in which a preliminary voltage pulse is applied to a gap between a wire electrode and the workpiece, and in which, at the breakdown of said preliminary voltage pulse, a first machining discharge pulse is applied to the wire electrode, comprising wherein a discharge position of said first machining discharge pulse along the engagement line of the wire electrode and the workpiece is determined in real time based on the voltage signals or current signals generated by said first machining discharge pulse, and that at least one additional machining discharge pulse is selectively applied directly after the first machining discharge pulse, in which said selective application of the additional machining discharge pulse is based on the determined discharge position and based on a digital pattern representing the desired pattern.

2. The WEDM method according to claim 1, wherein the digital pattern is stored in a primary storage of the machine tool, and the primary storage is accessible by the control unit.

3. The WEDM method according to claim 1, wherein the primary storage includes a memory array to store the digital pattern, preferably the primary storage includes a linear array or a plurality thereof, a rectangular array or a triangular array.

4. The WEDM method according to claim 1, wherein the memory array includes the information regarding the discharge position and pulse control data of the first machining discharge pulse or the additional discharge pulse.

5. The WEDM method according to claim 1, wherein the desired pattern is provided as an image file or a as a spreadsheet program file.

6. The WEDM method according to claim 1, wherein a conversion program reads the desired pattern and converts it into the digital pattern including a plurality of pixels, in particular, the conversion program assigned to each pixel a pixel data, such as a number.

7. The WEDM method according to claim 1, wherein the digital pattern is stored in said memory array by designating the cells of the memory array which shall be processed by at least one additional machining discharge pulse, or by designating the cells which according to the digital pattern shall be processed only by the first machining discharge pulse.

8. The WEDM method according to claim 1, wherein at least one additional machining discharge pulse is applied if the discharge position determined by applying the first machining discharge pulse is detected in a designated cell having the pixel data, which indicates applying the at least one additional discharge pulse.

9. The WEDM method according to claim 1, wherein the discharge position occurring along the engagement line of the wire electrode and the workpiece is discretized by dividing the workpiece height $H_{WP}$ into a number $N_S$ of vertical sections S of the workpiece, and that digital pattern includes a plurality of columns and a plurality of rows, wherein the number of rows of the digital pattern is set to be the same or a multiple of the number $N_S$ of vertical sections S, in particular the determined discharge position is assigned to one of the vertical sections.

10. The WEDM method according to claim 1, wherein the machining path is divided into a plurality of horizontal sections, in particular a horizontal section length $W_L$ is defined, whereat a global horizontal section length $W_{Lg}$ is defined for all columns of the digital pattern, or an individual horizontal section length $W_{Li}$ is defined for each column of the digital pattern.

11. The WEDM method according to claim 1, wherein the horizontal section length $W_L$ is computed from the product of the height of the vertical sections S times a height-to-width ratio of the desired pattern.

12. The WEDM method according to claim 1, wherein a starting point $L_0$ of the pattern is defined along of the machining path, preferably from the origin of the machining path.

13. The WEDM method according to claim 1, wherein the pixels to be processed by at least one additional pulse are designated by the operator.

14. The WEDM method according to claim 1, wherein the discharge energy or discharge type of the first machining discharge pulse or the discharge energy or discharge type of the at least one additional machining discharge pulse or the number of additional machining discharge pulses is specified in the cells, in accordance with an attribute of the desired pattern.

15. The WEDM method according to claim 14, wherein an action is carried out on the base of said recognized existing pattern.

16. The WEDM method according to claim 1, wherein the conversion program assigns the energy/type of the first machining discharge pulse or the energy/type/number of the at least one additional machining discharge pulse in accordance with an attribute of the desired pattern.

17. The WEDM method according to claim 14, wherein the discharge energy of the first machining discharge pulse or the discharge energy of an additional machining discharge pulse is modulated, by controlling one or more of: the current amplitude, the pulse duration, the pulse shape.

18. The WEDM method according to claim 1, wherein, the desired pattern is one or more of the following: an identifier, a machine-readable label, an augmented reality marker, a functional pattern, a decorative pattern.

19. The WEDM method according to claim 1, wherein the WEDM process for the application of a digital pattern is subtractive, additive, or both additive and subtractive.

20. The WEDM method according to claim 1, wherein a workpiece comprises at least a surface having an existing pattern on it, and that said surface is further processed by WEDM, and that said existing pattern is recognised by the detection of the discharge positions.

\* \* \* \* \*